US008881151B2

(12) United States Patent  
Dawson et al.

(10) Patent No.: US 8,881,151 B2
(45) Date of Patent: *Nov. 4, 2014

(54) CONTROL OF JAVA RESOURCE RUNTIME USAGE

(71) Applicant: International Business Machines Corporation, Armonk, NY (US)

(72) Inventors: Michael Hilton Dawson, Ottawa (CA); Andrew Russell Low, Stittsville (CA); Prashanth Kattige Nageshappa, Bengaluru (IN); Balbir Singh, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/890,563

(22) Filed: May 9, 2013

(65) Prior Publication Data

US 2013/0275976 A1 Oct. 17, 2013

Related U.S. Application Data

(63) Continuation of application No. 13/444,203, filed on Apr. 11, 2012.

(51) Int. Cl.
*G06F 9/455* (2006.01)
*G06F 9/46* (2006.01)
*G06F 15/173* (2006.01)
*G06F 9/50* (2006.01)

(52) U.S. Cl.
CPC ............ *G06F 9/50* (2013.01); *G06F 2209/505* (2013.01); *G06F 9/5061* (2013.01)

USPC .............. 718/1; 718/100; 718/102; 718/104; 718/105; 709/223; 709/224; 709/226

(58) Field of Classification Search
None
See application file for complete search history.

(56) References Cited

U.S. PATENT DOCUMENTS

| 6,546,546 | B1 | 4/2003 | Van Doorn |
| 6,912,617 | B2 | 6/2005 | Dmitriev |
| 7,552,153 | B2 | 6/2009 | Dostert et al. |
| 7,779,424 | B2 | 8/2010 | Cherkasova et al. |
| 2006/0271931 | A1* | 11/2006 | Harris et al. ...................... 718/1 |
| 2008/0028076 | A1 | 1/2008 | Gupta et al. |
| 2008/0028397 | A1 | 1/2008 | Gupta et al. |
| 2008/0028399 | A1 | 1/2008 | Gupta et al. |

(Continued)

OTHER PUBLICATIONS

Zhang et al, "Friendly Virtual Machines", Jun. 11-12, 2005, ACM, pp. 1-11.*

(Continued)

*Primary Examiner* — Charles Swift
(74) *Attorney, Agent, or Firm* — Nelson Mullins Riley & Scarborough, LLP

(57) ABSTRACT

A method for providing control of Java resource runtime usage may include establishing communication with one or more Java virtual machines (JVMs) forming a hive via a hive communication channel where the hive comprises a plurality of JVMs configured to enable utilization of at least one shared resource, receiving, via the hive communication channel, environmental information indicative of hive activity relative to the at least one shared resource from at least one of the one or more JVMs, and adapting, via processing circuitry, operations associated with use of the at least one shared resource based on the environmental information.

8 Claims, 5 Drawing Sheets

(56) References Cited

U.S. PATENT DOCUMENTS

| | | |
|---|---|---|
| 2008/0244576 A1 | 10/2008 | Kwon et al. |
| 2010/0094861 A1 | 4/2010 | Andrade et al. |
| 2010/0153945 A1 | 6/2010 | Bansal et al. |
| 2010/0162242 A1 | 6/2010 | Grouzdev |
| 2010/0251250 A1 | 9/2010 | Kishan et al. |
| 2011/0010713 A1 | 1/2011 | Matsumoto et al. |
| 2011/0072427 A1 | 3/2011 | Garmark |
| 2011/0119748 A1 | 5/2011 | Edwards et al. |
| 2012/0011499 A1* | 1/2012 | Conover et al. ............. 718/1 |
| 2012/0102190 A1* | 4/2012 | Durham et al. ............. 709/224 |
| 2012/0137006 A1* | 5/2012 | Minato et al. ............. 709/226 |
| 2012/0174097 A1 | 7/2012 | Levin |
| 2012/0246637 A1* | 9/2012 | Kreeger et al. ............. 718/1 |
| 2012/0284410 A1* | 11/2012 | Dudek et al. ............. 709/226 |
| 2013/0160011 A1 | 6/2013 | Corrie |
| 2013/0179881 A1* | 7/2013 | Calder et al. ............. 718/1 |
| 2013/0268940 A1 | 10/2013 | Gmach et al. |

OTHER PUBLICATIONS

Zhang et al, "Adaptive Self-Configuration Architecture for J2EE-based Middleware Systems", Proceedings of the 39th Hawaii International Conference on System Sciences, 2006, IEEE, pp. 1-8.*

Office Action of co-pending U.S. Appl. No. 13/444,203 mailed Nov. 20, 2013.

Oracle JRockit Mission Control Overview, Jun. 2008.

Interface MemoryMXBean, http://docs.oracle.com/javase/1.5.0/docs/api/java/lang/management/memorymxbean.html, printed Apr. 11, 2012.

Office action of co-pending U.S. Appl. No. 13/444,203 mailed Feb. 14, 2014.

* cited by examiner

CONTROL OF JAVA RESOURCE RUNTIME USAGE

CROSS-REFERENCE TO RELATED APPLICATIONS

This patent application is a continuation of copending U.S. patent application Ser. No. 13/444,203, filed on Apr. 11, 2012, and entitled "CONTROL OF JAVA RESOURCE RUNTIME USAGE," the entirety of which is hereby incorporated by reference as if set forth verbatim herein and relied upon for all purposes.

BACKGROUND

Example embodiments generally relate to resource management technology and, more particularly, relate to a mechanism by which Java runtime resource usage may be controlled.

SUMMARY

Some example embodiments may provide a hive for Java virtual machine (JVM) entities and/or a bridge between one or more JVMs and one or more non-JVM entities such as external agents including, for example, a hypervisor and/or a workload manager and/or a live migration assistant such that a broader picture of resource usage and/or needs of a system may be achieved. Some example embodiments may enable JVMs to join the hive, publish and seek information from other hive participants and use such information to manage and/or adapt to the environment in which the JVMs are running. Accordingly, resource management (e.g., usage of memory, threads, processors and/or the like) may be improved.

In this regard, for example, one example embodiment may include a method for providing control of Java resource runtime usage. The method may include establishing communication with one or more Java virtual machines (JVMs) forming a hive via a hive communication channel where the hive comprises a plurality of JVMs configured to enable utilization of at least one shared resource, receiving (e.g., via the hive communication channel) environmental information indicative of hive activity relative to the at least one shared resource from at least one of the one or more JVMs, and adapting (e.g., via processing circuitry) operations associated with use of the at least one shared resource based on the environmental information at operation.

In another example embodiment, an apparatus for providing control of Java resource runtime usage is provided. The apparatus may include processing circuitry configured for establishing communication with one or more Java virtual machines (JVMs) forming a hive via a hive communication channel where the hive comprises a plurality of JVMs configured to enable utilization of at least one shared resource, receiving (e.g., via the hive communication channel) environmental information indicative of hive activity relative to the at least one shared resource from at least one of the one or more JVMs, and adapting operations associated with use of the at least one shared resource based on the environmental information at operation.

In another example embodiment, a computer program product for providing control of Java resource runtime usage is provided. The computer program product may include a computer-readable storage medium having computer-executable program code instructions stored therein. The computer-executable program code instructions may include program code instructions for establishing communication with one or more Java virtual machines (JVMs) forming a hive via a hive communication channel where the hive comprises a plurality of JVMs configured to enable utilization of at least one shared resource, receiving (e.g., via the hive communication channel) environmental information indicative of hive activity relative to the at least one shared resource from at least one of the one or more JVMs, and adapting (e.g., via processing circuitry) operations associated with use of the at least one shared resource based on the environmental information.

BRIEF DESCRIPTION OF THE SEVERAL VIEWS OF THE DRAWINGS

Figure 1:
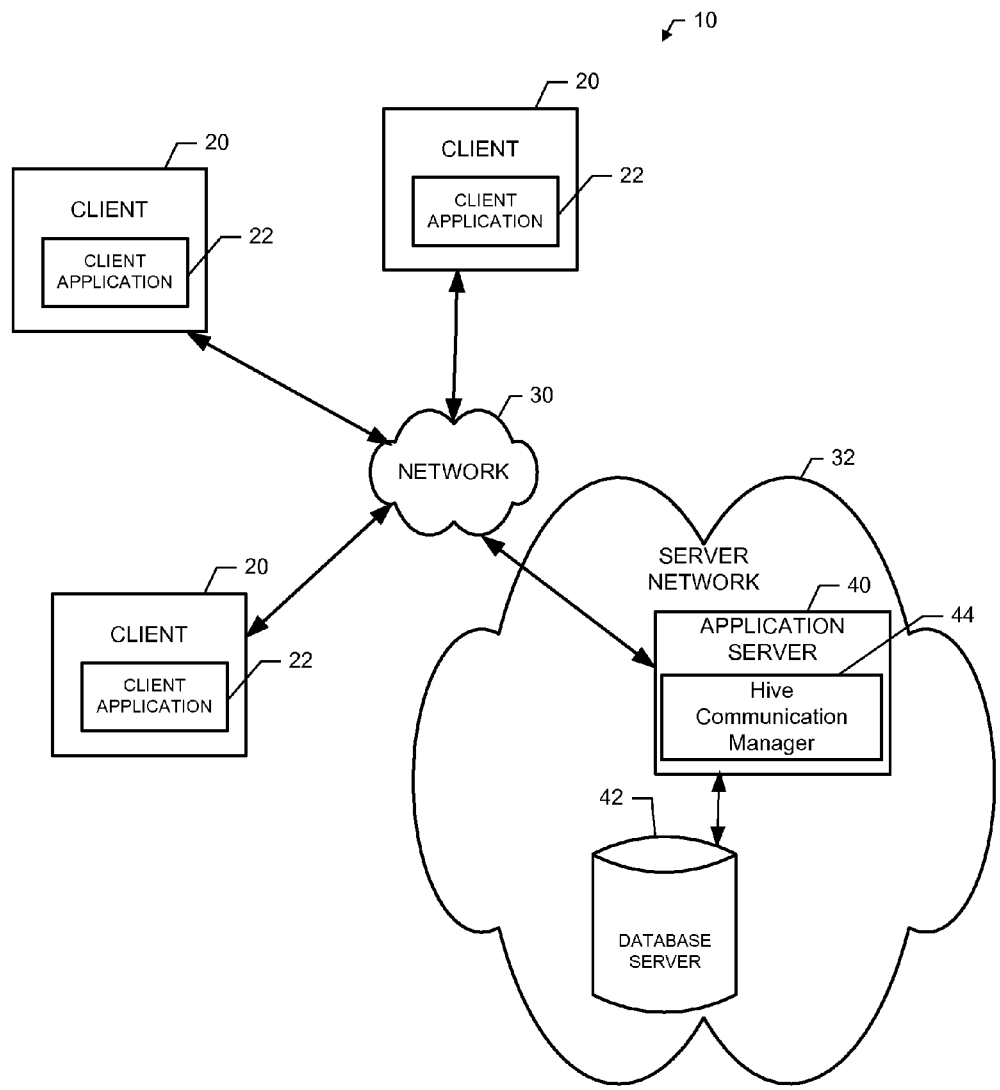
Figure 2:
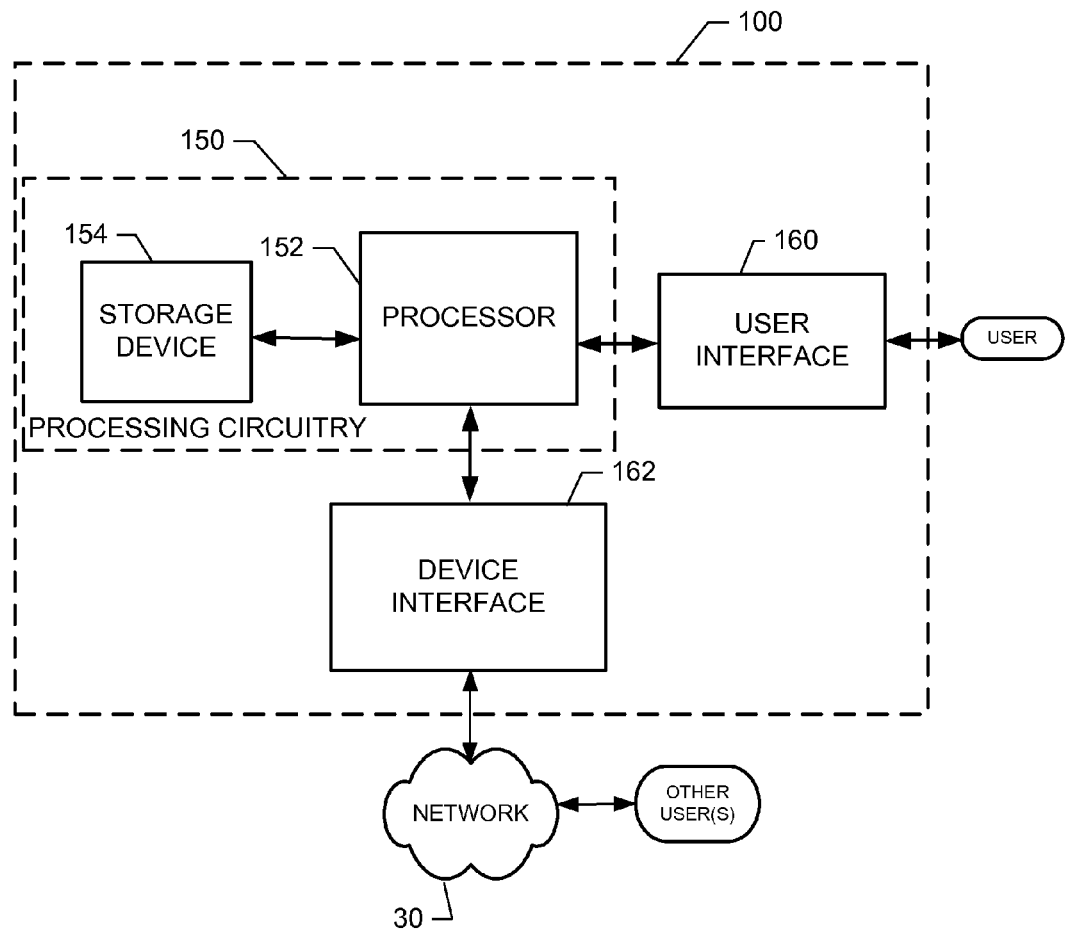
Figure 3:
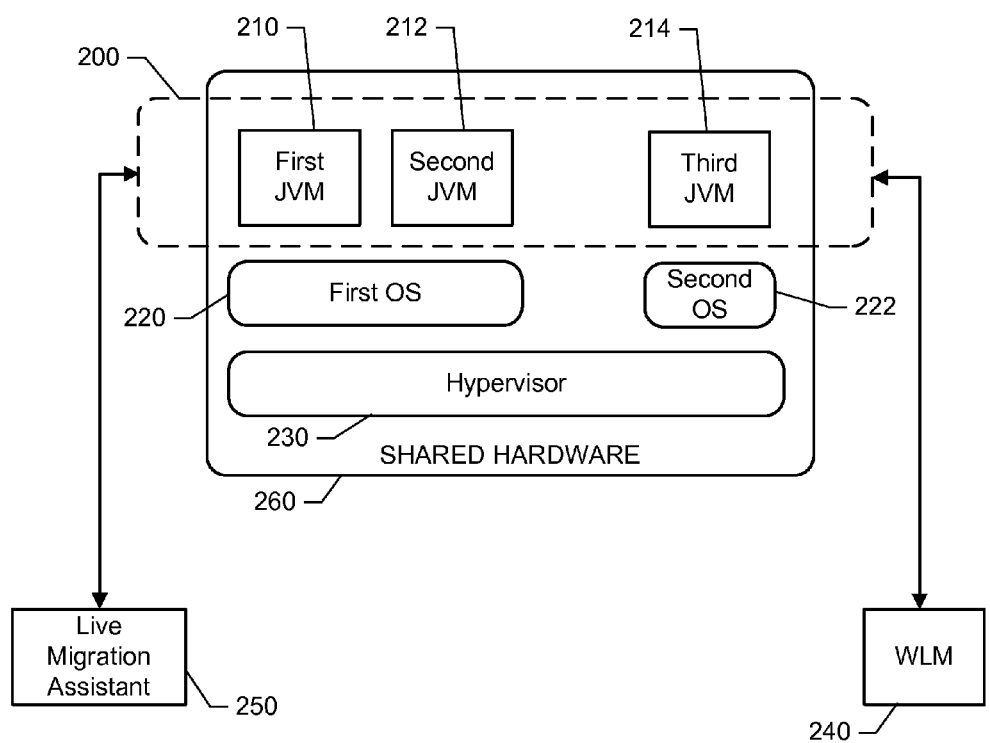
Figure 4:
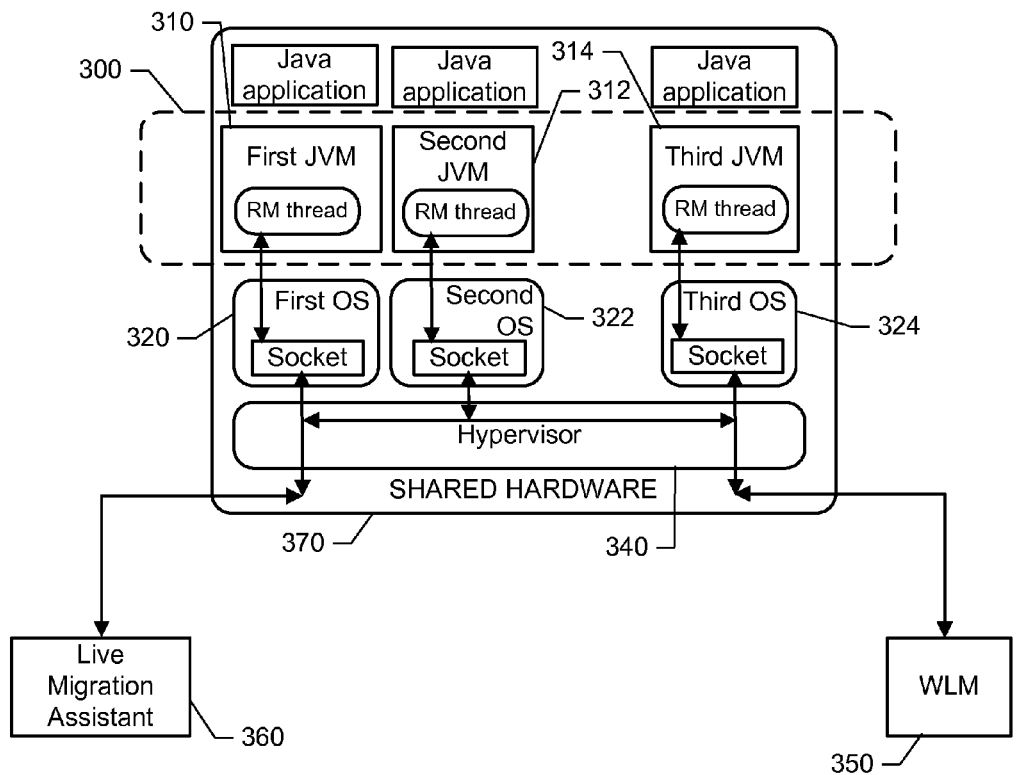
Figure 5:
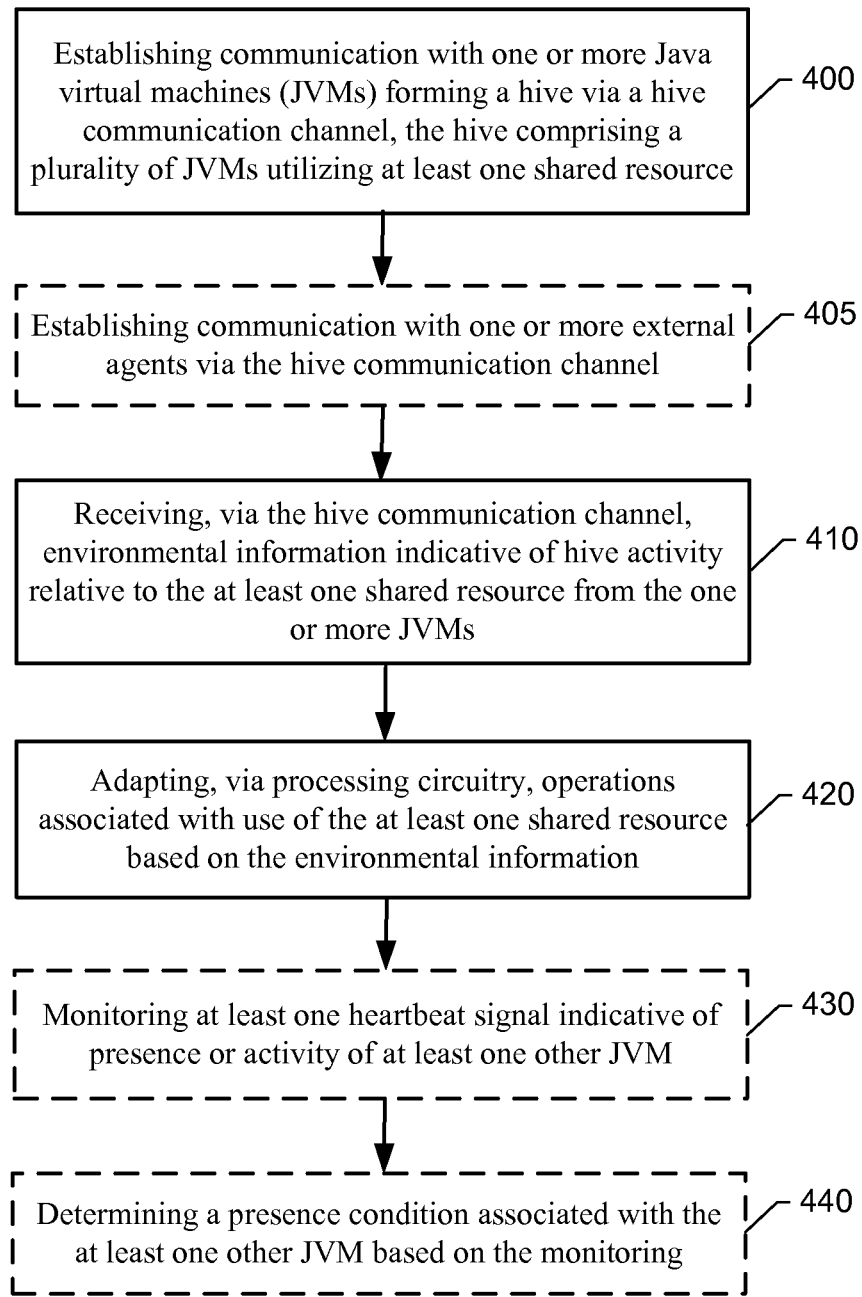

Having thus described the invention in general terms, reference will now be made to the accompanying drawings, which are not necessarily drawn to scale, and wherein:

FIG. 1 illustrates a functional block diagram of a system for providing control of Java resource runtime usage according to an example embodiment;

FIG. 2 illustrates a functional block diagram of an apparatus for providing control of Java resource runtime usage according to an example embodiment;

FIG. 3 is a conceptual block diagram illustrating entities associated with hive operation according to an example embodiment;

FIG. 4 illustrates a block diagram of a simple implementation of a hive that only supports direction from external agents as opposed to co-operative exchange according to an example embodiment; and FIG. 5 illustrates a block diagram showing operations associated with a method for providing control of Java resource runtime usage according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

With electronic devices becoming ubiquitous in our daily lives, various applications and software have been developed, and continue to be developed, in order to give the users of such devices robust capabilities to perform tasks, communicate, entertain themselves, etc., in either fixed or mobile environments. However, many electronic devices may have different operating systems, hardware and software configurations and the like. Thus, many such devices may require different versions of a particular application to be developed in order to permit operation of the particular application at each different type of electronic device. If such different versions were developed to correspond to each different operating system, the cost of developing software and applications would be increased.

Accordingly, virtual machines (VMs) have been developed. A VM is a self-contained operating environment that behaves as if it is a separate computer. The VM may itself be a piece of computer software that isolates the application being used by the user from the host computer or operating system. For example, Java applets run in a Java VM (JVM) which acts as an abstract interface to the host operating system. Because versions of the VM are written for various computer platforms, any application written for the VM can be operated on any of the platforms, instead of having to produce separate versions of the application for each computer and operating system. The application may then be run on a computer using, for example, an interpreter such as Java. Java, which is well known in the industry, is extremely portable, flexible and powerful with respect to allowing applications to, for example, access features of the electronic device on which they are employed. Thus, Java has been widely used by developers to develop portable applications that can be run on a wide variety of electronic devices or computers without modification.

Particularly in environments where resources are scarce or where large amounts of resources are used due to consumer demand, it is often important to conserve or reuse resources whenever possible. In this regard, efforts have been exerted to try to conserve or reclaim resources of VMs when the resources are no longer needed by a particular application as a part of workload optimization. An application consumes resources during operation. When the application is no longer in use, some of the resources are reclaimable (e.g. memory) while other resources are not reclaimable (e.g. used processing time). Some reclaimable resources include resources that are explicitly allocated by an application code and application programming interface (API) methods called by the application code such as, for example, plain Java objects. With regard to these reclaimable resources, garbage collection techniques have been developed to enhance reclamation of these resources. For example, once an object such as a Java object is no longer referenced it may be reclaimed by a garbage collector of the VM. Other operations aimed at conserving or reclaiming resources are also continuously being developed and employed.

Workload optimized systems may need or otherwise employ multiple JVMs running on the same hardware either in the same operating system (OS) instance or in different OS instances that may be running under a hypervisor. In such example cases, it may be desirable to ensure that all of the physical resources are not consumed by a single JVM. In some cases, hardware including processors and/or memory may be over committed such that the resources that appear to be available are not actually fully allocated for use by the JVM. Further complicating some examples, hypervisors may vary the available memory, processor and/or other resources while the JVMs are already running.

Current systems do not allow a JVM to know what other JVMs may be running on the same hardware (or other non-Java applications for that matter) and thus, JVMs are currently unable to adjust their behavior in order to optimize themselves for their environment. In an era in which dynamic infrastructure and infrastructure management are employed, sets of JVMs and applications running on shared hardware may change dynamically. Accordingly, shared hardware itself and associated resources may be changed by workload managers during the runtime of applications depending on the ecosystem/workload needs.

As an example, consider managed memory. Managed memory is one of the major benefits provided by Java platforms. Applications allocate objects in a Java heap. When the Java heap is close to full, the JVM invokes a garbage collector (GC) to identify unused objects having memory that can be used for future allocations. The operation of the GC may free up large amounts of memory in the Java heap such that for further object allocations, the freed memory may be used. The JVM may typically provide various parameters to control the resource usage (e.g., memory used Java heap, thread stacks, storing compiled code or threads to perform garbage collection, JIT (just-in-time) compilation, etc.). These parameters are often set during startup of a Java application and may not be possible to be modified during runtime of the application. The JVM effectively acts as a resource cache on behalf of the user application, allocating and retaining resources (e.g., memory) in anticipation of future needs. Fixed resource settings set when JVMs are started may be a poor fit for the dynamic systems envisioned in the future. Thus, for example, if a workload manager identifies that the workload has drastically decreased (e.g., due to reduced numbers of users in off-peak hours), then the workload manager cannot reclaim memory back from the application in order to save energy used to keep all the memory units powered up.

Some example embodiments may alleviate this situation by enabling the JVM to obtain information about its environment so that the information can be used to, among other things, enable the JVM to vary its resource usage dynamically. As such, some example embodiments may provide a mechanism by which to enable information sharing between JVMs and other information sources (e.g., hypervisors) so that the information shared can be used to adapt the JVMs to the environment in which they are running. The JVMs may therefore be enabled to cooperate with an entire ecosystem for control of resource usage. Furthermore, any workload manager or resource manager may be enabled to request a variance in resource usage from any particular JVM.

Some example embodiments may enable "hive communications" between JVMs. In this regard, some embodiments may define a group of JVMs that share resources (e.g., on a single platform or device, or across a plurality of networked devices that may be collocated or remotely distributed) within a hive. The hive may provide a bridge between JVMs to enable each JVM to develop a broader picture of resource usage and needs within the hive. Additionally, other non-JVM entities may be enabled to participate in the hive to provide either additional information related to quality of service hints or directives to the JVMs. As a result, resource usage management may be accomplished across JVMs to enable more efficient resource management (e.g., resource usage may approach 100% without exceeding it).

In some embodiments, connection to the hive may be accomplished via a communication channel that may be established for provision and/or publication of information to other hive participants. The communication channel may be implemented using internet protocol (IP) or shared memory implementations in hub-spoke or peer-to-peer (P2P) configurations. In order to accommodate hypervisor scenarios, bridge processes may be defined that may enable joining of the hive on behalf of each OS, or such functionality may be built into the hypervisor itself.

FIG. 1 illustrates an example system in which an embodiment of the present invention may be employed. As shown in FIG. 1, a system 10 according to an example embodiment may include one or more client devices (e.g., clients 20). Notably, although FIG. 1 illustrates three clients 20, it should be appreciated that many more clients 20 may be included in some embodiments and thus, the three clients 20 of FIG. 1 are simply used to illustrate a multiplicity of clients 20 and the number of clients 20 is in no way limiting to other example embodiments. In this regard, example embodiments are scalable to inclusion of any number of clients 20 being tied into the system 10. Moreover, it should be appreciated that FIG. 1 illustrates one example embodiment in which shared resources may be allocated within a community of networked devices (e.g., clients 20). However, it should be appreciated that the architecture of various example embodiments may vary. Thus, the example of FIG. 1 is merely provided for ease of explanation of one example embodiment and should not be considered to be limiting with respect to the architecture of the system 10.

The clients 20 may, in some cases, each be computing devices associated with different individuals, locations or entities within an organization. For example, among the clients 20, one client may be associated with a first facility or location of a first organization. Meanwhile, a second client may be associated with a second facility or location of the first organization. However, in some embodiments, each of the clients 20 may be associated with individuals, locations or entities associated with different organizations. As such, for example, some of the clients 20 may be associated with the first organization, while other ones of the clients 20 are associated with a second organization. Thus, for example, the clients 20 may be remotely located from each other, collocated, or combinations thereof.

Each one of the clients 20 may include or otherwise be embodied as a computing device (e.g., a computer, a network access terminal, a personal digital assistant (PDA), cellular phone, smart phone, or the like) capable of communication with a network 30. As such, for example, each one of the clients 20 may include (or otherwise have access to) memory for storing instructions or applications for the performance of various functions and a corresponding processor for executing stored instructions or applications and a corresponding processor or processing circuitry. Each one of the clients 20 may also include software and/or corresponding hardware for enabling the performance of the respective functions of the clients as described below. In an example embodiment, one or more of the clients 20 may include a client application 22 including software for enabling a respective one of the clients 20 to communicate with the network 30 for requesting and/or receiving information and/or services via the network 30. The information or services receivable at the client applications 22 may include deliverable components (e.g., downloadable software to configure the clients 20, or information for consumption or utilization at the clients 20). In an example embodiment, one or more of the clients 20 may have a different operating system (OS) than at least one other one of the clients 20. However, in some embodiments, every one of the clients 20 could have its own different OS.

The network 30 may be a data network, such as a local area network (LAN), a metropolitan area network (MAN), a wide area network (WAN) (e.g., the Internet), and/or the like, which may couple the clients 20 to devices such as processing elements (e.g., personal computers, server computers or the like) and/or databases. Communication between the network 30, the clients 20 and the devices or databases (e.g., servers) to which the clients 20 are coupled may be accomplished by either wireline or wireless communication mechanisms and corresponding communication protocols. As such, for example, the network 30 may form a cloud computing environment.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of a service. The cloud model may include at least five characteristics, at least three service models and at least four deployment models.

Some of the characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

In an example embodiment, devices to which the clients 20 may be coupled via the network 30 may include a server network 40 including one or more application servers (e.g., application server 40), and/or a database server 42, which together may form respective elements of a server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 and the database server 42 may each include hardware and/or software for configuring the application server 40 and the database server 42, respectively, to perform various functions. As such, for example, the application server 40 may include processing logic and memory enabling the application server 40 to access and/or execute stored computer readable instructions for performing various functions.

In an example embodiment, one function that may be provided by the application server 40 may be the provision of hive communications between JVMs associated with one or more of the clients 20 and/or servers of the server network 32 as described herein. However, in some embodiments, hive communications may be provided by one or a combination of the clients 20 between JVMs of the clients 20, and thus, there may be no need for the server network 32 at all. Alternatively, hive communications may be established between JVMs of the server network 32 without any clients 20.

As an example, the application server 40 may be configured to provide clients 20 with access to the tools for hive communication by executing the tools from the cloud, or by enabling the clients 20 to download the tools from the cloud and execute the tools locally. Thus, in some cases, the client application 22 may be an instance of the tools described herein (e.g., an instance of hive communication manager 44). However, as indicated above, the tools may instead be instantiated at the application server 40 and/or in the database server 42 for cloud-based execution of some example embodiments.

In some embodiments, for example, the application server 40 and/or one or more of the clients 20 may include an instance of a hive communication manager 44 comprising stored instructions for handling activities associated with practicing example embodiments as described herein. As such, in some embodiments, the clients 20 may access the hive communication manager 44 online and utilize the services provided thereby relative to resources shared over the network. However, it should be appreciated that in other embodiments, the hive communication manager 44 may be provided from the application server 40 (e.g., via download over the network 30) to one or more of the clients 20 to enable recipient clients to instantiate an instance of the hive communication manager 44 for local operation relative to local resources of the respective clients 20. As yet another example, the hive communication manager 44 may be instantiated at one or more of the clients 20 responsive to downloading instructions from a removable or transferable memory device carrying instructions for instantiating the hive communication manager 44 at the corresponding one or more of the clients 20.

In an example embodiment, the application server 40 may include or have access to memory (e.g., internal memory or the database server 42) for storing instructions or applications for the performance of various functions and a corresponding processor for executing stored instructions or applications. For example, the memory may store an instance of the hive communication manager 44 configured to operate in accordance with an example embodiment of the present invention. In this regard, for example, the hive communication manager 44 may include software for enabling the application server 40 to communicate with the network 30 and/or the clients 20 for the provision and/or receipt of information associated with performing activities as described herein.

Referring now to FIG. 2, an apparatus 100 for provision of tools associated with control of Java resource runtime usage is provided. The apparatus 100 may be a cloud computing node, in some embodiments. However, since not all embodiments are necessarily practiced in a cloud computing environment, it should be appreciated that the apparatus 100 is not necessarily a cloud computing node in all example embodiments. The apparatus 100 may be an embodiment of the hive communication manager 44 or a device hosting the hive communication manager 44. In some embodiments, the apparatus 100 may be a personal computer system, server computer system, thin client, thick client, handheld or laptop device, multiprocessor system, microprocessor-based system, set top box, programmable consumer electronic device, network PC, minicomputer system, mainframe computer system, distributed cloud computing environment that includes and of the above systems or devices, and/or the like (e.g., one of the clients 20 or a server of the server network 32). The apparatus 100 may function, according to its configuration, as any of a number of different entities. As such, configuration of the apparatus 100 as described herein may transform the apparatus 100 into the hive communication manager 44. In some cases, configuration of the apparatus 100 may be accomplished via executable instructions such as program modules executed by a computer system. The program modules may include routines, programs, objects, components, logic, data structures, and so on that perform particular tasks or implement particular abstract data types.

In an example embodiment, the apparatus 100 may include or otherwise be in communication with processing circuitry 150 that is configured to perform data processing, application execution and other processing and management services according to an example embodiment of the present invention. In one embodiment, the processing circuitry 150 may include a storage device 154 and a processor 152 (which may itself include one or more processors) that may be in communication with or otherwise control a user interface 160 and a device interface 162. As such, the processing circuitry 150 may be embodied as a circuit chip (e.g., an integrated circuit chip) configured (e.g., with hardware, software or a combination of hardware and software) to perform operations described herein. However, in some embodiments, the processing circuitry 150 may be embodied as a portion of a server, computer, laptop, workstation or even one of various mobile computing devices. In situations where the processing circuitry 150 is embodied as a server or at a remotely located computing device, the user interface 160 may be disposed at another device (e.g., at a computer terminal or network access terminal) that may be in communication with the processing circuitry 150 via the device interface 162 and/or a network (e.g., network 30).

Internal communication among components of the apparatus 100 may be accomplished via a communication bus. Such a communication bus may represent one or more of several types of bus structures, including a memory bus or memory controller, a peripheral bus, an accelerated graphics port, and a processor or local bus using any of a variety of bus architectures. By way of example, and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The user interface 160 may be in communication with the processing circuitry 150 to receive an indication of a user input at the user interface 160 and/or to provide an audible, visual, mechanical or other output to the user. As such, the user interface 160 may include, for example, a keyboard, a mouse, a joystick, a display, a touch screen, a microphone, a pointing device, a speaker, or other input/output mechanisms. In embodiments where the apparatus is embodied at a server or other network entity, the user interface 160 may be limited or even eliminated in some cases. Alternatively, as indicated above, the user interface 160 may be remotely located.

The device interface 162 may include one or more interface mechanisms for enabling communication with other devices and/or networks. In some cases, the device interface 162 may be any means such as a device or circuitry embodied in either hardware, software, or a combination of hardware and software that is configured to receive and/or transmit data from/to a network and/or any other device or module in communication with the processing circuitry 150. In this regard, the device interface 162 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 162 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, the storage device 154 may include one or more non-transitory storage or memory devices such as, for example, volatile and/or non-volatile memory that may be either fixed or removable. As such, the storage device 154 may include random access memory (RAM) and/or cache memory. In some embodiments, the storage device 154 may be a magnetic disk drive or an optical disk drive (e.g., CD ROM, DVD ROM and/or the like). The storage device 154 may be configured to store information, data, applications, program modules, instructions or the like for enabling the apparatus to carry out various functions in accordance with example embodiments of the present invention. For example, the storage device 154 could be configured to buffer input data for processing by the processor 152. Additionally or alternatively, the storage device 154 could be configured to store instructions for execution by the processor 152. As yet another alternative, the storage device 154 may include one of a plurality of databases that may store a variety of files, contents or data sets. Among the contents of the storage device 154, applications may be stored for execution by the processor 152 in order to carry out the functionality associated with each respective application.

The processor 152 may be embodied in a number of different ways. For example, the processor 152 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 152 may be configured to execute instructions stored in the storage device 154 or otherwise accessible to the processor 152. As such, whether configured by hardware or software methods, or by a combination thereof, the processor 152 may represent an entity (e.g., physically embodied in circuitry) capable of performing operations according to embodiments of the present invention while configured accordingly. Thus, for example, when the processor 152 is embodied as an ASIC, FPGA or the like, the processor 152 may be specifically configured hardware for conducting the operations described herein. Alternatively, as another example, when the processor 152 is embodied as an executor of software instructions, the instructions may specifically configure the processor 152 to perform the operations described herein.

In an example embodiment, the processor 152 (or the processing circuitry 150) may be embodied as, include or otherwise control the hive communication manager 44, which may be any means such as a device or circuitry operating in accordance with software or otherwise embodied in hardware or a combination of hardware and software (e.g., processor 152 operating under software control, the processor 152 embodied as an ASIC or FPGA specifically configured to perform the operations described herein, or a combination thereof) thereby configuring the device or circuitry to perform the corresponding functions of the hive communication manager 44, as described herein.

In some embodiments, the apparatus 100 may operate based on a set of functional abstraction layers including, for example, a hardware and software layer, a virtualization layer, a management layer and/or a workload layer. In an example embodiment, the hardware and software layer may be provided via a plurality of hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide). The virtualization layer may provide an abstraction layer from which the following examples of virtual entities may be provided: virtual servers; virtual storage; virtual networks, including virtual private networks; virtual applications and operating systems; and virtual clients. In one example, the management layer may provide any of a number of functions including, for example, resource provisioning metering and pricing, billing or invoicing, security user portal provides access, service level management, Service Level Agreement (SLA) planning and fulfillment, and/or the like. The workloads layer may provide examples of functionality for which the cloud computing environment may be utilized.

Examples of workloads and functions which may be provided from this layer include provision of a tool for discovery and realization of business measurement concepts using industry models.

Operation of some example embodiments will now be described in reference to FIG. 3. FIG. 3 is a conceptual block diagram illustrating operation of an example embodiment. As shown in FIG. 3, a hive 200 may be formed including a plurality of JVMs. In this example, three JVMs are shown including a first JVM 210, a second JVM 212 and a third JVM 214. However, it should be appreciated that the example of FIG. 3 is merely provided to show a multiplicity of JVMs and any number of JVMs could be included in the hive 200 in other example embodiments. In the example of FIG. 3, the first and second JVMs 210 and 212 may share a first OS 220. Meanwhile, the third JVM 214 may have a different OS (e.g., second OS 222). The hive 200 may be in communication with external agents including, for example, a hypervisor 230 and/or a workload manager 240 and a live migration assistant 250. The hive 200 may operate with respect to one or more shared resources such as shared hardware 260 (which may include a single hardware platform or shared hardware resources that are networked together).

In an example embodiment, one or more instances of the hive communication manager 44 may be present within the architecture shown in FIG. 3 to enable communication between the first JVM 210, the second JVM 212 and the third JVM 214 (e.g., via a hive communication channel). In this regard, an instance of the hive communication manager 44 may be present at each JVM or at one or more external agents. The hive communication channel may also be utilized, in some cases, by the external agents including the hypervisor 230, the workload manager 240 and/or the live migration assistant 250 in order to maximize resource usage and work together to avoid over-commit scenarios. Other types of workload management related entities (e.g., balloon drivers, virtualization managers, live migration tools, and/or the like) may also join the hive 200 and/or communicate via the hive communication channel as external agents.

Information may be periodically and/or continuously published or otherwise communicated via the hive communication channel. In some embodiments, when a JVM joins the hive 200, the joining JVM may publish a request for other JVMs to resend current information so that the joining JVM may be enabled to build a database relating to the information provided. Once bootstrapped, the joining JVM may then update its processes based on the information provided. Generally speaking, information exchanged over the hive communication channel may include information regarding the number of JVM's that are members of the hive 200 (or are otherwise running in the environment), information indicative of memory allocated to the heap, information indicative of other memory currently allocated by a JVM, information indicative of the number of runnable and non-runnable threads in a JVM, information indicative of a garbage collector state (e.g., running, not running, number of threads used, etc.), and/or the like.

Other information that may be useful in allowing each JVM to make resource allocation or environmental tuning decisions, may also or alternatively be exchanged. As an example, when a JVM starts, the JVM may use information broadcast by other JVMs to set its initial resource usage. In this regard, for example, if the starting JVM is aware of how many other JVMs are running, the starting JVM may be enabled to adjust the number of garbage collection threads it uses. Moreover, as updates come in to the starting JVM via the hive communication channel, the number of garbage collection threads used may be adjusted based on environmental changes. The starting JVM may also dynamically adjust its own resource usage based on the updates. As an example, if the starting JVM receives information informing it as to the total number of threads running across JVMs, it could decide on its thread spinning strategies based on a level of over-commitment of the shared hardware 260. In this regard, for example, if 32 processes and 10 runnable threads exist across the hive 200, then enabling a thread spinning strategy to use unused cycles may be desirable. If there are 32 processors and 1000 runnable threads, then enabling a thread spinning strategy may be less desirable.

In an example embodiment, communication via the hive communication channel may enable the provision of accurate information (e.g., environmental information) to individual JVMs about the environment in which they are operating. For example, one of the JVMs (e.g., the first JVM 210) may be aware of the existence of X processors within the environment and the first JVM 210 may see all X processors as being available for utilization. However, the first JVM 210 may only be allocated a portion of the X processors. Similarly, the first JVM 210 may see Y amount of memory as being available. However, the memory may actually be overcommitted. Communication between the members of the hive 200 and the external agents may enable the injection of more accurate information into the hive 200 by the external agents based on information the external agents may have regarding resource allocation. The first JVM 210 (and other JVMs of the hive 200) may then utilize this information to override information that may otherwise be obtained through operating system calls.

In some embodiments, the external agents may act as a bridge across different environments running on the same hardware. For example, if the hypervisor 230 is supporting JVMs running on several partitions, which are sharing resources (e.g., utilizing the same shared hardware 260 or other resources), the hypervisor 230 may be enabled to bridge messages between hives in each partition so that the hives can make decisions based on the knowledge of that which is running across the partitions. The external agents may also act as controllers to direct the ways in which the JVMs adjust their resource usage through additional control level messages so that instead of simply exchanging information between JVMs, the external agents may make requests to the JVMs to adapt. For example, in a situation where a workload manager 240 is aware that certain hours of the day typically experience lighter transaction volume, the workload manager 240 may utilize the hive communication channel to direct JVMs to reduce resource usage. In some cases, the communications sent over the hive communication channel may include requests relating to reducing or otherwise modifying heap usage, changing thread spin strategies (e.g., to help reduce power consumption), controlling how fast threads can be started, and/or the like. Communications over the hive communication channel may be generally addressed to all entities monitoring the hive communication channel, or may be directed to specific JVMs. Communications on the hive communication channel could be based on externally available information such as knowledge of transaction peaks, or may be based on information that is available from the hive 200. Accordingly, decisions may be made by external agents relative to deciding that adjustments should be made beyond the heuristics built into versions of the JVMs that are running in the hive 200.

According to some example embodiments, the hive technique (e.g., forming a hive including a hive communication channel formed as a communication layer supporting network communication indicative of environmental activity of hive members, the hive being formed via one or more instances of the hive communication manager 44) may provide improvements relative to situations where JVMs are not enabled to share information. In this regard, for example, by enabling JVMs to share information amongst themselves and external agents, more efficient resource usage may be accomplished. For example, if two JVMs are started on the same machine, the two JVMs can exchange information and make adjustments to their operations based on the exchanged information. In an example embodiment, the hive communication manager 44 may enable the sharing of the information amongst the JVMs. Moreover, in some embodiments the hive communication manager 44 may further provide instruction generation capability for enabling the JVMs and/or the external agents to monitor hive communication channel traffic and/or generate hive communication channel traffic, some of which may allow the hive communication manager 44 to direct adjustments to various parameters, operations, and/or policies.

In some embodiments, the hive communication manager 44 (or individual instances thereof at each entity in communication via the hive communication channel) may be configured to monitor and/or generate heartbeat signals to indicate presence and/or activity in the hive 200. Thus, for example, if a particular entity fails to transmit a heartbeat signal at a predetermined interval, other entities may be able to determine that the particular entity has left the hive 200 (either for routine (normal) reasons or for non-routine (abnormal) reasons). Information associated with a JVM that has left the hive 200 may then be flushed within each other entity in communication via the hive communication channel.

As an alternative, FIG. 4 illustrates a block diagram of a simple implementation of a hive that only supports directions from external agents as opposed to co-operative exchange. As shown in FIG. 4, the JVMs (e.g., a first JVM 310, a second JVM 312, and a third JVM 314 may each be associated with corresponding Java applications and respective different operating systems (e.g., first OS 320, second OS 322, and third OS 324). An instance of the hive communication manager 44 may be present at each respective JVM to enable the corresponding JVM to generate or execute a resource manager (RM) thread. The RM thread may monitor communication (e.g., via a hive communication channel) by listening to a socket (e.g., a first socket 330, a second socket 332 and a third socket 334). The socket may be a network socket or a shared memory socket. AS such, the sockets may form a hive communication channel linking each of the JVMs to various external agents including hypervisor 340, a workload manager (WLM) 350 and a live migration assistant 360, along with the shared hardware 370 that forms a common resource platform for the JVMs. Various control commands may be received via the socket at each respective JVM. The control commands may include commands that trigger garbage collection, shrink or expand the heap to a certain size, stop further JIT compilation, perform aggressive garbage collection to free large amounts of memory, use more or less threads for garbage collection/JIT, reduce memory usage for JIT compilation or maintaining internal caches like a zip cache, etc., as messages on the socket, and/or the like. When commands are received, appropriate actions may be triggered from the RM thread to fulfill requests. After actions are performed, the RM thread may send a message back to the source of the control commands to report back the actions taken and any effects of those actions.

Thus, for example, the hive communication manager 44 (e.g., via the processing circuitry 150) may be configured to establish communication with one or more Java virtual machines (JVMs) forming a hive via a hive communication channel where the hive comprises a plurality of JVMs utilizing (e.g., sharing access to or resources of) at least one shared resource, receive (e.g., via the hive communication channel) environmental information indicative of hive activity relative to at least one shared resource from one or more JVMs, and adapt operations associated with use of at least one shared resource based on the environmental information.

From a technical perspective, the apparatus 100 described above may be configured accordingly to be used to support some or all of the operations described herein in relation to the hive communication manager 44. As such, the platform described in FIG. 2 may be used to facilitate the implementation of several computer program and/or network communication based interactions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A method according to one embodiment of the invention will now be described in reference to FIG. 5. The method may include establishing communication with one or more Java virtual machines (JVMs) forming a hive via a hive communication channel where the hive comprises a plurality of JVMs configured to enable utilization of at least one shared resource at operation 400, receiving (e.g., via the hive communication channel) environmental information indicative of hive activity relative to the at least one shared resource from at least one of the one or more JVMs at operation 410, and adapting (e.g., via processing circuitry) operations associated with use of the at least one shared resource based on the environmental information at operation 420. Of note, the receipt of the environmental information may be either directly or indirectly received such that there may, in some cases, be intermediate nodes or components.

In some embodiments, certain ones of the operations above may be modified or further amplified as described below. Moreover, in some embodiments additional optional operations may also be included (some examples of which are shown in dashed lines in FIG. 5). It should be appreciated that each of the modifications, optional additions or amplifications below may be included with the operations above either alone or in combination with any others among the features described herein. In this regard, in some embodiments the method may further include establishing communication with one or more external agents via the hive communication channel at operation 405. The one or more external agents may include a workload manager, a hypervisor, a live migration tool and/or the like. In some embodiments, the method may further include monitoring at least one heartbeat signal indicative of presence or activity of at least one other JVM at operation 430 and determining a presence condition associated with the at least one other JVM based on the monitoring at operation 440. In an example embodiment, receiving environmental information indicative of hive activity may include receiving information indicative of allocation of shared memory resources, receiving information indicative of allocation of shared processing resources, receiving information indicative of garbage collection state, and/or receiving information indicative of running or runnable threads. In some embodiments, the method may include receiving external information (e.g., information on peak usage times). The adapting may include increasing resource usage, decreasing resource usage, triggering garbage collection, shrinking or expanding the heap to a certain size, stopping further JIT compilation, performing aggressive garbage collection to free large amounts of memory, using more or less threads for garbage collection/JIT, reducing memory usage for JIT compilation or maintaining internal caches like a zip cache, etc., and/or the like.

In an example embodiment, an apparatus for performing the method of FIG. 5 above may comprise a processor (e.g., the processor 152) configured to perform some or each of the operations (400-440) described above. The processor may, for example, be configured to perform the operations (400-440) by performing hardware implemented logical functions, executing stored instructions, or executing algorithms for performing each of the operations.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method comprising:
   establishing communication among a plurality of Java virtual machines (JVMs) forming a hive via a hive communication channel, the hive comprising the plurality of JVMs configured to enable utilization of at least one shared resource;
   receiving, at a subset of the plurality of JVMs via the hive communication channel, environmental information broadcast by one or more JVMs outside of the subset of the plurality of JVMs indicative of hive activity relative to the at least one shared resource; and
   independently adapting, at each JVM in the subset of the plurality of JVMs via processing circuitry, operations associated with use of the at least one shared resource based on the environmental information.

2. The method of claim 1, further comprising establishing communication with one or more external agents via the hive communication channel.

3. The method of claim 2, wherein establishing communication with the one or more external agents comprises establishing communication with a workload manager, a hypervisor or a live migration tool.

4. The method of claim 1, wherein receiving environmental information indicative of hive activity comprises receiving information indicative of allocation of shared memory resources or information indicative of allocation of shared processing resources.

5. The method of claim 1, wherein receiving environmental information indicative of hive activity comprises receiving information indicative of garbage collection state.

6. The method of claim 1, wherein receiving environmental information indicative of hive activity comprises receiving information indicative of running or runnable threads.

7. The method of claim 1, further comprising monitoring at least one heartbeat signal indicative of presence or activity of at least one JVM and determining a presence condition associated with the at least one JVM based on the monitoring.

8. The method of claim 1, wherein the hive communication channel comprises a communication layer supporting network communication indicative of the environmental information associated with hive members.

* * * * *